(12) United States Patent  
Haueis

(10) Patent No.: US 6,888,470 B2  
(45) Date of Patent: May 3, 2005

(54) SENSING OF MIRROR POSITION IN AN OPTICAL SWITCH

(75) Inventor: Martin Haueis, Summit, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 43 days.

(21) Appl. No.: 10/261,085

(22) Filed: Sep. 30, 2002

(65) Prior Publication Data

US 2004/0061618 A1 Apr. 1, 2004

(51) Int. Cl.⁷ .............................................. G08B 21/00
(52) U.S. Cl. .................................. 340/686.1; 359/221
(58) Field of Search ......................... 340/606.4, 686.1; 359/291, 214, 298, 221, 224, 295

(56) References Cited

U.S. PATENT DOCUMENTS

| | | |
|---|---|---|
| 5,136,671 A | 8/1992 | Dragone |
| 5,600,322 A | 2/1997 | Garavan |
| 5,648,618 A | 7/1997 | Neukermans et al. |
| 6,201,631 B1 | 3/2001 | Greywall |
| 6,243,507 B1 | 6/2001 | Goldstein et al. |
| 6,275,326 B1 | 8/2001 | Bhalla et al. |
| 6,292,600 B1 | 9/2001 | Goldstein et al. |
| 6,526,194 B1 * | 2/2003 | Laor ........................... 385/18 |
| 2003/0214696 A1 * | 11/2003 | Oettinger et al. ........... 359/290 |

* cited by examiner

Primary Examiner—Julie B. Lieu

(57) ABSTRACT

A MEMS device employed in an optical switch has a position sensor configured to determine mirror orientation in the device. The position sensor includes at least one light sensor located under an etch gap defining the mirror in the switch. Change of light intensity at each light sensor due to the change in separation corresponding to the etch gap during mirror motion is measured and related to the mirror deflection angle. Information about the angle may be used to provide feedback to the motion actuator, which then may be operated to orient the mirror more accurately.

22 Claims, 4 Drawing Sheets

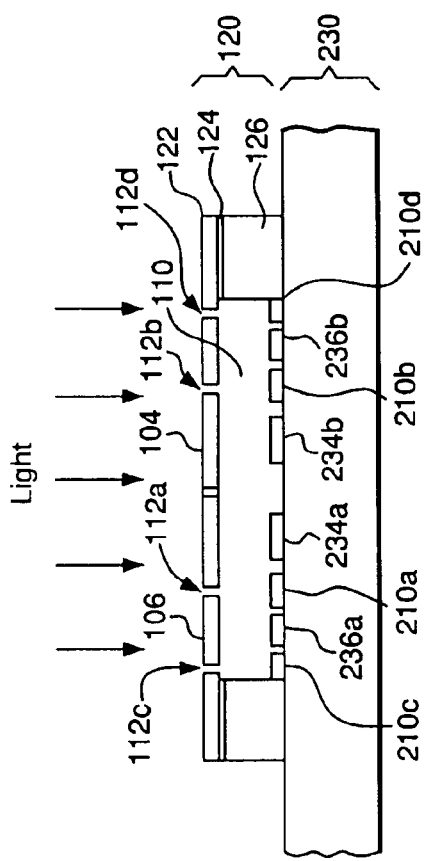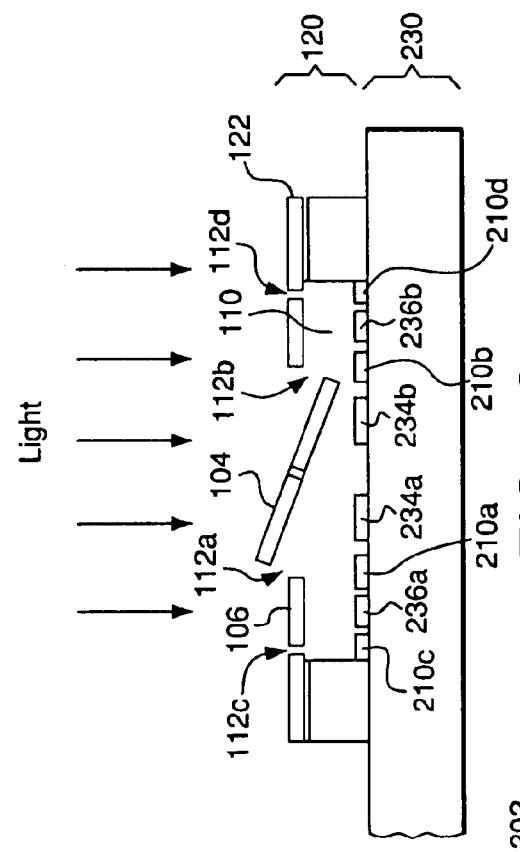

SENSING OF MIRROR POSITION IN AN OPTICAL SWITCH

BACKGROUND OF THE INVENTION

1. Field of the Invention

The invention relates to optical communication equipment and, more specifically, to micro-electromechanical devices for use in such equipment.

2. Description of the Related Art

Optical communication equipment often employs micro-electromechanical systems (MEMS). A typical MEMS system may include an array of micro-machined mirrors, each mirror individually movable in response to an electrical signal. Such an array may be employed in an optical cross-connect, in which each mirror in the array receives a beam of light, for example, from an input optical fiber. The beam is reflected from the mirror and can be redirected to a different location, e.g., at which is located an output optical fiber, by rotating the mirror. More details on the principle of operation and methods of manufacture of MEMS devices including mirror arrays may be found, for example, in commonly assigned U.S. Pat. No. 6,201,631, the teachings of which are incorporated herein by reference.

One problem with prior art MEMS devices is related to determining the actual position of each mirror given any particular input electrical signal, which is important for optimal operation of a MEMS device. With relatively thin springs supporting each mirror/gimbal, there is little space for implementing position sensors, e.g., a four-terminal piezo-voltage torsion sensor such as disclosed in U.S. Pat. No. 5,648,618, the teachings of which are incorporated herein by reference.

SUMMARY OF THE INVENTION

The problems in the prior art are addressed, in accordance with the principles of the invention, by a position sensor integrated into a MEMS device, which is configured to determine the position of a movable part of the MEMS device. The process of forming the movable part includes the step of etching a gap between structure corresponding to the movable part and structure corresponding to the rest of the MEMS device. During operation of the MEMS device, when the movable part is moved relative to the rest of the MEMS device, the separation between the movable part and the rest of the MEMS device, corresponding to the etched gap, changes. For example, for a MEMS device in which the movable part is a mirror rotatably coupled to a stationary part of the MEMS device, rotating the mirror with respect to the stationary part changes the separation between the mirror and the stationary part.

In accordance with the principles of the invention, the position sensor includes at least one light sensor located below the etched gap formed between the movable part and the rest of the MEMS device. When the movable part is moved relative to the rest of the MEMS device, the associated change in the separation results in a change in the amount of incident light that reaches the at least one light sensor. The resulting change in the electrical signal generated by the at least one light sensor provides information that can be used to determine the current position of the movable part with respect to the rest of the MEMS device. That information may be used to generate feedback signals for the motion actuator of the MEMS device to position the movable part more accurately.

BRIEF DESCRIPTION OF THE DRAWINGS

FIGS. 2A–C show top and cross-sectional views of a switch that may be part of the array of FIG. 1 according to one embodiment of the invention.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1B:
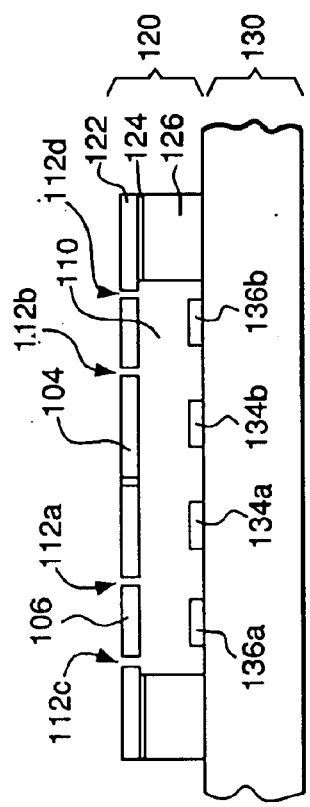
FIGS. 1A–C illustrate top and cross-sectional views of a representative MEMS array that may be used in an optical cross-connect.
Figure 1C:
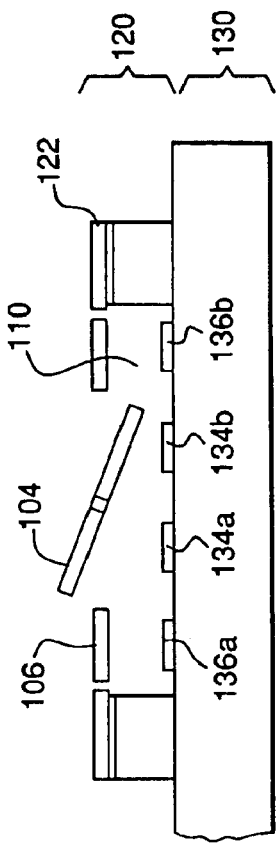
Figure 1A:
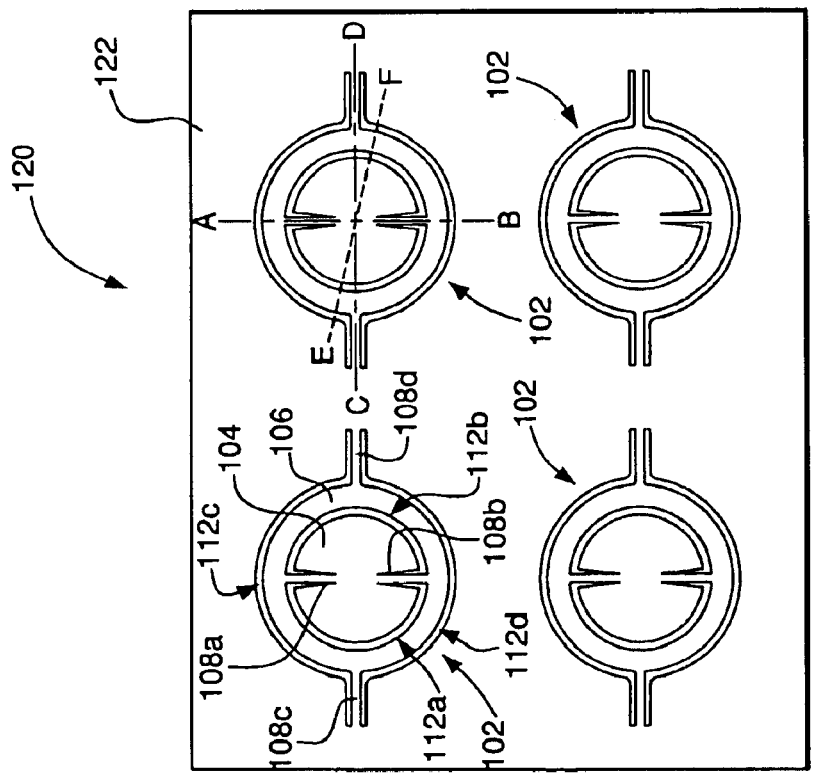

FIG. 1A shows a top view of a representative MEMS array 100 that may be used in an optical cross-connect. Array 100 comprises four two-axis switches 102, each of which includes a movable mirror 104 and a movable gimbal 106, both formed in an overlayer 122 of a wafer 120 using, e.g., reactive etching. Mirror 104 is defined by gaps 112a–b between the mirror and gimbal 106. Similarly, gimbal 106 is defined by gaps 112c–d between the gimbal and the rest of overlayer 122. Typically, wafer 120 is a silicon-on-insulator (SOI) wafer in which overlayer 122 comprises crystalline silicon. Gimbal 106 is supported on wafer 120 by a pair of springs 108c–d, each connected between gimbal 106 and the rest of overlayer 122. Mirror 104 is coupled to gimbal 106 by a pair of springs 108a–b. In a representative embodiment shown in FIG. 1, each of springs 108a–d is a torsional rod that is about 2 µm wide. In a different embodiment, each of springs 108a–d may be of a different shape and/or have different dimensions.

FIG. 1B shows a cross-sectional view of one switch 102 of array 100 along line EF in FIG. 1A. Mirror 104 and gimbal 106 are supported above a cavity 110 defined in an insulating layer 124 and a substrate layer 126 of wafer 120. A second wafer 130 includes electrodes 134a–b and 136a–b as well as electrical interconnections (not shown). Substrate layer 126 is attached to wafer 130 such that electrodes 134 and 136 are located beneath mirror 104 and gimbal 106, respectively, in cavity 110.

FIG. 1C illustrates how mirror 104 can be rotated. More specifically, mirror 104 rotates about the axis defined by springs 108a–b (e.g., axis AB in FIG. 1A) in response to voltage applied to at least one of electrodes 134a–b. In addition, mirror 104 rotates about the axis defined by springs 108c–d (e.g., axis CD in FIG. 1A) together with gimbal 106 when the gimbal rotates about that axis in response to voltage applied to at least one of electrodes 136a–b. Changing the voltages applied to individual electrodes 134a–b and 136a–b can change the angles of rotation about the two axes (e.g., axes AB and CD in FIG. 1A), thus enabling a cross-connecting function of array 100. As already indicated above, detecting an instant position of each mirror 104 is important for enabling optimal operation of array 100.

Figure 2A:
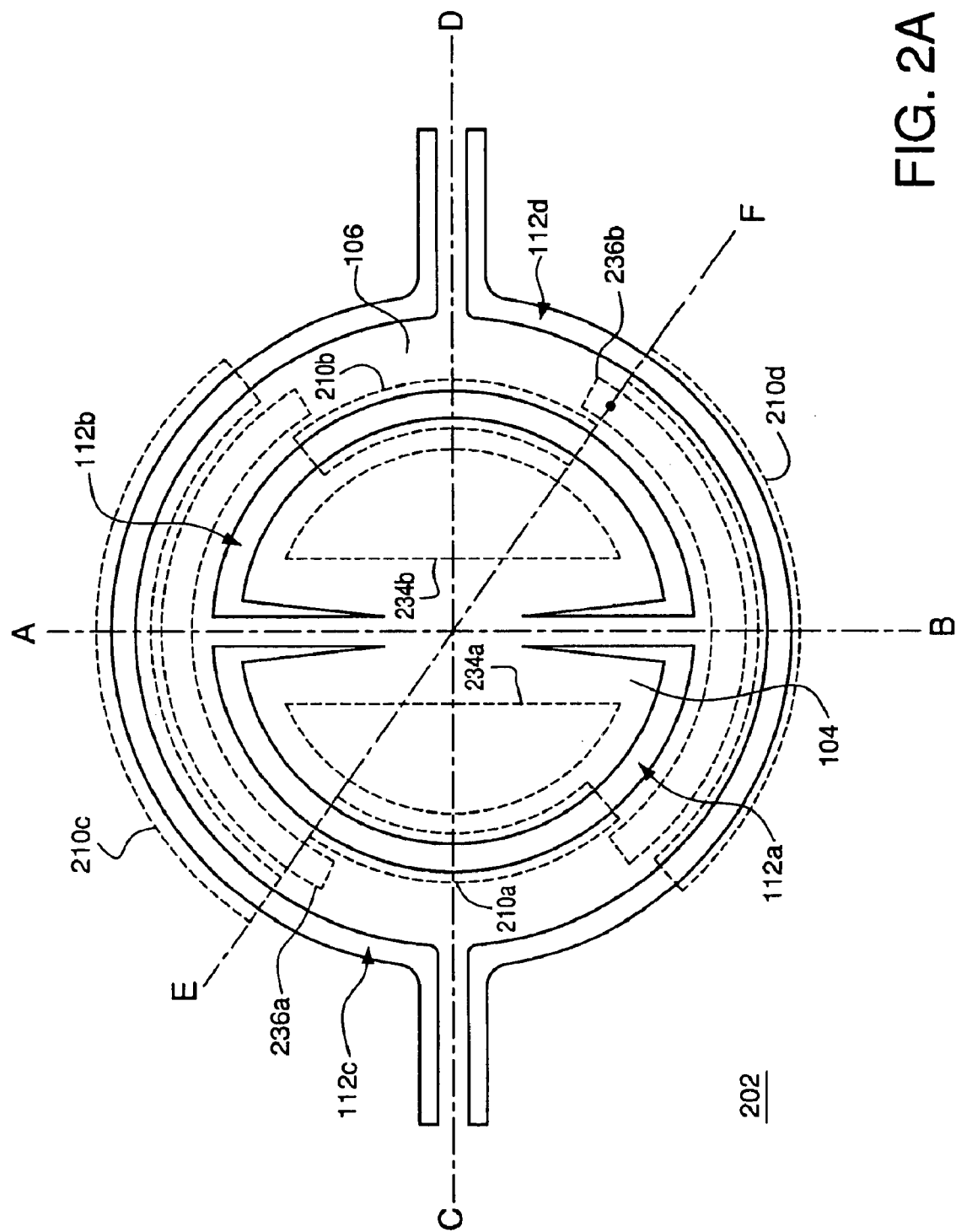

FIGS. 2A–C show top and cross-sectional views of a switch 202 that may be part of an array analogous to array 100 according to one embodiment of the invention. Switch 202 is similar to switch 102. However, instead of wafer 130, switch 202 has wafer 230. Wafer 230 has four electrodes 234a–b and 236a–b that are similar to electrodes 134a–b and 136a–b, respectively. In addition, wafer 230 includes one or more light sensors 210. In a representative embodiment shown in FIG. 2, wafer 230 has four sensors 210a–d.

FIG. 2A shows in dashed lines an exemplary layout of sensors 210a–d and electrodes 234a–b and 236a–b. Each sensor 210a–d is positioned under gap 112a–d. In a different embodiment, instead of being located under the corresponding gaps, each sensor 210 in switch 202 may be located beneath an aperture formed in the mirror and/or gimbal for that sensor.

FIGS. 2B–C show cross-sectional views of switch 202 along line EF in FIG. 2A. As illustratively shown in FIG. 2B, switch 202 is illuminated by a source of light (not shown) such that sensors 210 are illuminated through the corresponding gaps. In one application, the wavelength of the illuminating light is different from that of an optical signal routed by switch 202. In addition, sensor 210 may include a corresponding filter (not shown) to reduce interference from the optical signal. In another application, the illuminating light is the optical signal routed by switch 202.

FIG. 2C shows switch 202 when mirror 104 is tilted and gimbal 106 remains in a horizontal position. Due to the mirror tilt, the separation corresponding to each gap 112a–b is widened, which allows more light to fall onto corresponding sensor 210a–b. Similarly, when gimbal 106 is tilted with respect to substrate 126, the separation corresponding to each gap 112c–d is widened, which allows more light to fall onto corresponding sensors 210c–d. When both mirror 104 and gimbal 106 are tilted, the amount of light impinging on each sensor 210c–d depends on the tilt angle of gimbal 106 with respect to substrate 126, whereas the amount of light impinging on each sensor 210a–b depends on the relative tilt angle of mirror 104 with respect to gimbal 106.

Figure 3:
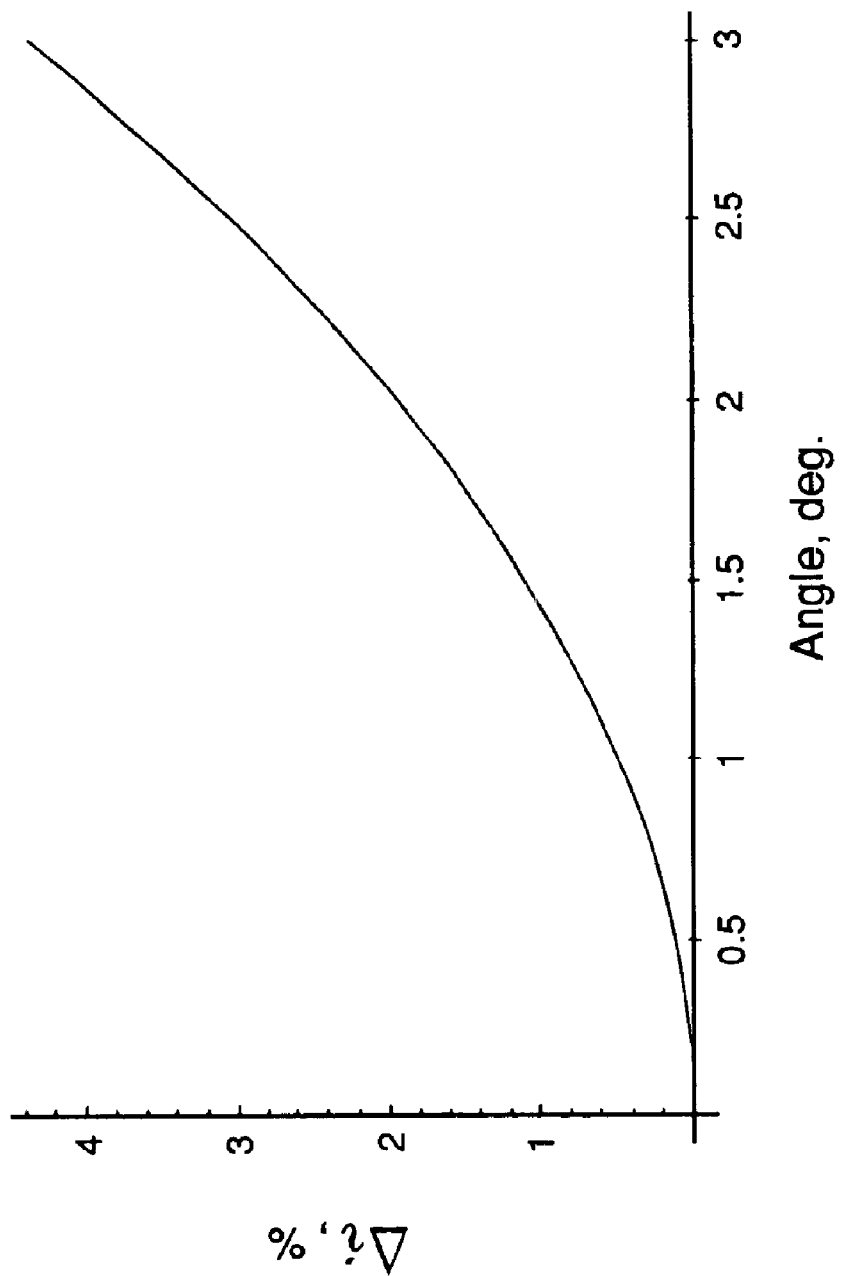
FIG. 3 illustrates response of a light sensor to mirror rotation in the switch of FIG. 2 in one embodiment of the invention.

FIG. 3 illustrates change in photocurrent generated, e.g., by sensor 210a in switch 202, as a function of tilt angle in one embodiment of the invention. More specially, FIG. 3 shows the change in photocurrent ($\Delta i = i - i_0$), when mirror 104 is tilted and gimbal 106 remains in the horizontal position as shown in FIG. 2B, where i and $i_0$ represent the photocurrents in the tilted and non-tilted mirror positions, respectively. As seen in FIG. 3, the change in photocurrent is nonlinear and progressively increases with the tilt angle. For example, change of the angle from 1 degree to 2 degrees generates photocurrent increase of about 1.5%, whereas change of the angle from 2 to 3 degrees generates photocurrent increase of about 2.5%. Using FIG. 3, the tilt angle can be determined from the photocurrent change. In a different embodiment, where a light sensor is located beneath an aperture in mirror 104 or gimbal 106, the photocurrent decreases when the mirror/gimbal is tilted, since the effective area of the aperture (i.e., normal to the incident light) decreases.

In one embodiment, the following illustrative procedure may be used to determine the orientation of mirror 104 in switch 202. In a first step, the angle of rotation of gimbal 106 about axis CD (FIG. 2A) is determined using the photocurrent change at sensors 210c and/or 210d. In a second step, the angle of rotation of mirror 104 relative to gimbal 106 about axis AB (FIG. 2A) is determined using the photocurrent change at sensors 210a and/or 210b. In a third step, the orientation of mirror 104 in switch 202, e.g., with respect to substrate 122, is obtained using the angles determined in the first and second steps.

The following representative parameters may be implemented in switch 202 according to one embodiment of the invention: (1) about $5 \times 10^{-6}$ for the ratio of gaps area to the total switch area; (2) about 2.5 $\mu$A for the photocurrent generated using a 1-Watt light source; and (3) about 40 nA/degree for the sensor sensitivity around the tilt angle of 3 degrees.

The invention may provide one or more of the following advantages. A position sensor of the invention may be implemented in a switch configured with springs having a relatively narrow width. Information about the mirror position obtained with such sensor may be used to provide feedback to the actuating electrodes (e.g., electrodes 134 and 136). Such feedback may be used to provide shaped pulses to the actuating electrodes, where the voltage applied to each electrode is a function of mirror position. Shaped pulses may be used to increase the switching speed. In addition, the feedback may be used to stabilize the mirror in the unstable angle region close to or beyond snap-down. (As known in the art, when voltage applied to an actuating electrode approaches a critical value, the tilt angle of the mirror begins to increase rapidly and nonlinearly with the voltage. This behavior may cause a collision (i.e., snap-down) of the mirror against the electrode and/or wafer.) Stabilization of the mirror near snap-down may extended the available angular range.

While this invention has been described with reference to illustrative embodiments, this description is not intended to be construed in a limiting sense. Light sensors may be implemented on the same wafer as the actuating electrodes or on a different wafer. In the latter case, light sensors may be placed in the packaging adjacent to a chip having the switch where the bottom portion of the switch (e.g., wafer 130) has the corresponding apertures configured to expose the sensors to light. Various optical filters, lenses, and/or light-reflecting structures may be used in conjunction with light sensors as known in the art. Each light sensor may be differently shaped and be based on any suitable light-sensitive device, such as a photodiode, a phototransistor, a photogate, photo-conductor, a charge-coupled device, a charge-transfer device, or a charge-injection device. The light used for light-sensor illumination may be based on the optical signal applied to the switch or be generated by a different light source. Similarly, as used in this specification, the term "light" refers to any suitable electromagnetic radiation in any wavelength and is not necessarily limited to visible light. Also, a switch of the invention may be implemented in wafers different from SOI wafers. In a one-axis switch, as few as one sensor 210 may be used. Similarly, in a two-axis switch, as few as two sensors 210 may be used, one for each axis. Furthermore, the invention may be implemented in different MEMS devices for determining orientation/position of various movable parts, e.g., sliding (shutter) plates, in those devices. Various modifications of the described embodiments, as well as other embodiments of the invention, which are apparent to persons skilled in the art to which the invention pertains are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A MEMS device, comprising:
   a stationary part; and
   a movable part movably coupled to the stationary part, wherein:
   the stationary part includes a first light sensor adapted to generate a first electrical signal and a second light sensor adapted to generate a second electrical signal that indicate a position of the movable part with respect to the stationary part in response to light impinging on the device;
   the movable part comprises:
   a first plate rotatably coupled to the stationary part; and
   a second plate rotatably coupled to the first plate;
   the stationary part and the movable part are separated by a gap;
   the first light sensor is adapted to be illuminated through the gap;
   the separation between the stationary part and the movable part changes as the position of the movable part changes with respect to the stationary part;
   the first electrical signal indicates orientation of the first plate with respect to the stationary part; and
   the second electrical signal indicates orientation of the second plate with respect to the first plate.

2. The invention of claim 1, wherein:
   the stationary part and the first plate are separated by a first gap;
   the first plate and the second plate are separated by a second gap;
   the first light sensor is adapted to be illuminated through the first gap;
   the second light sensor is adapted to be illuminated through the second gap;
   the separation between the first plate and the stationary part changes as the orientation of the first plate changes with respect to the stationary part; and
   the separation between the second plate and the first plate changes as the orientation of the second plate changes with respect to the first plate.

3. The invention of claim 1, wherein:
   the device is implemented using a first wafer and a second wafer;
   the first wafer includes the movable part; and
   the second wafer includes the first light sensor.

4. A MEMS device, comprising:
   a stationary part; and
   a movable part movably coupled to the stationary part, wherein:
   the stationary part includes a first light sensor adapted to generate a first electrical signal that indicates a position of the movable part with respect to the stationary part in response to light impinging on the device;
   an aperture is defined in the movable part;
   the first light sensor is adapted to be illuminated by the light that passes through the aperture substantially without reflection from the movable part; and
   the effective area of the aperture changes as the position of the movable part changes with respect to the stationary part.

5. The invention of claim 1, wherein:
   the movable part has a mirror; and
   the MEMS device is part of an optical switch having two or more of the MEMS devices.

6. The invention of claim 1, wherein a motion actuator of the MEMS device is adapted to control motion of the movable part relative to the stationary part based on a feedback signal generated from the first electrical signal.

7. A method comprising:
   receiving light at a MEMS device having a stationary part and a movable part movably coupled to the stationary part; and
   generating, with a first light sensor of the stationary part, a first electrical signal that indicates a position of the movable part with respect to the stationary part in response to the light;
   generating, with a second light sensor of the stationary part, a second electrical signal in response to the light, wherein:
   the movable part comprises:
   a first plate rotatably coupled to the stationary part; and
   a second plate rotatably coupled to the first plate:
   the stationary part and the movable part are separated by a gap;
   the first light sensor is illuminated through the gap;
   the separation between the stationary part and the movable part changes as the position of the movable part changes with respect to the stationary part;
   the first electrical signal indicates orientation of the first plate with respect to the stationary part; and
   the second electrical signal indicates orientation of the second plate with respect to the first place.

8. The invention of claim 7, wherein:
   the stationary part and the first plate are separated by a first gap;
   the first plate and the second plate are separated by a second gap;
   the first light sensor is illuminated through the first gap;
   the second light sensor is illuminated through the second gap;
   the separation between the stationary part and the first plate changes as the orientation of the first plate changes with respect to the stationary part; and
   the separation between the second plate and the first plate changes as the orientation of the second plate changes with respect to the first plate.

9. The invention of claim 7, wherein the device is part of an optical switch and the light is an optical signal routed by the switch.

10. The invention of claim 7, wherein the device is part of an optical switch and the light is different from an optical signal routed by the switch.

11. The invention of claim 7, further comprising:
    receiving a feedback signal based on the position of the movable part with respect to the stationary part; and
    applying the feedback signal to a motion actuator of the MEMS device to control motion of the movable part relative to the stationary part.

12. The invention of claim 1, wherein:
    an aperture is defined in the movable part;
    the second light sensor is adapted to be illuminated through the aperture; and
    the effective area of the aperture changes as the position of the movable part changes with respect to the stationary part.

13. The invention of claim 4, wherein:
    the device is implemented using a first wafer and a second wafer;

the first wafer includes the movable part; and the second wafer includes the first light sensor.

14. The invention of claim 4, wherein:

the movable part has a mirror; and the MEMS device is part of an optical switch having two or more of the MEMS devices.

15. The invention of claim 4, wherein a motion actuator of the MEMS device is adapted control motion of the movable part relative to the stationary part based on a feedback signal generated from the first electrical signal.

16. The invention of claim 7, wherein:

an aperture is defined in the movable part;

the second light sensor is adapted to be illuminated through the aperture; and the effective area of the aperture changes as the position of the movable part changes with respect to the stationary part.

17. A method comprising:

receiving light at a MEMS device having a stationary part and a movable part movably coupled to the stationary part; and generating, with a first light sensor of the stationary part, a first electrical signal that indicates a position of the movable part with respect to the stationary part in response to the light, wherein:

an aperture is defined in the movable part;

the first light sensor is adapted to be illuminated by the light that passes through the aperture substantially without reflection from the movable part; and the effective area of the aperture changes as the position of the movable part changes with respect to the stationary part.

18. The invention of claim 17, further comprising:

receiving a feedback signal based on the position of the movable part with respect to the stationary part; and applying the feedback signal to a motion actuator of the MEMS device to control motion of the movable part relative to the stationary part.

19. A MEMS device, comprising:

a stationary part; and a movable part movably coupled to the stationary part, wherein:

the stationary part includes a first light sensor adapted to generate a first electrical signal that indicates a position of the movable part with respect to the stationary part in response to light impinging on the device;

the stationary part and the movable part are separated by a gap;

the first light sensor is adapted to be illuminated by the light that passes through the gap substantially without reflection from the movable part; and the separation between the stationary part and the movable part changes as the position of the movable part changes with respect to the stationary part.

20. A method comprising:

receiving light at a MEMS device having a stationary part and a movable part movably coupled to the stationary part; and generating, with a first light sensor of the stationary part, a first electrical signal that indicates a position of the movable part with respect to the stationary part in response to the light, wherein:

the stationary part and the movable part are separated by a gap;

the first light sensor is adapted to be illuminated by the light that passes through the gap substantially without reflection from the movable part; and the separation between the stationary part and the movable part changes as the position of the movable part changes with respect to the stationary part.

21. A MEMS device, comprising:

a stationary part; and a movable part movably coupled to the stationary part, wherein:

the stationary part includes a first light sensor adapted to generate a first electrical signal that indicates a position of the movable part with respect to the stationary part in response to light impinging on the device;

the stationary part and the movable part include portions fabricated from a single layer of a layered wafer, wherein said portions are separated by an opening formed in said single layer; and the first light sensor is adapted to be illuminated by the light that passes through the opening, wherein, when the movable part changes position with respect to the stationary part, the amount of the light that passes through the opening changes.

22. A method comprising:

receiving light at a MEMS device having a stationary part and a movable part movably coupled to the stationary part; and generating, with a first light sensor of the stationary part, a first electrical signal that indicates a position of the movable part with respect to the stationary part in response to the light, wherein:

the stationary part and the movable part include portions fabricated from a single layer of a layered wafer, wherein said portions are separated by an opening formed in said single layer; and the first light sensor is adapted to be illuminated by the light that passes through the opening, wherein, when the movable part changes position with respect to the stationary part, the amount of the light that passes through the opening changes.

* * * * *